Figure 1:
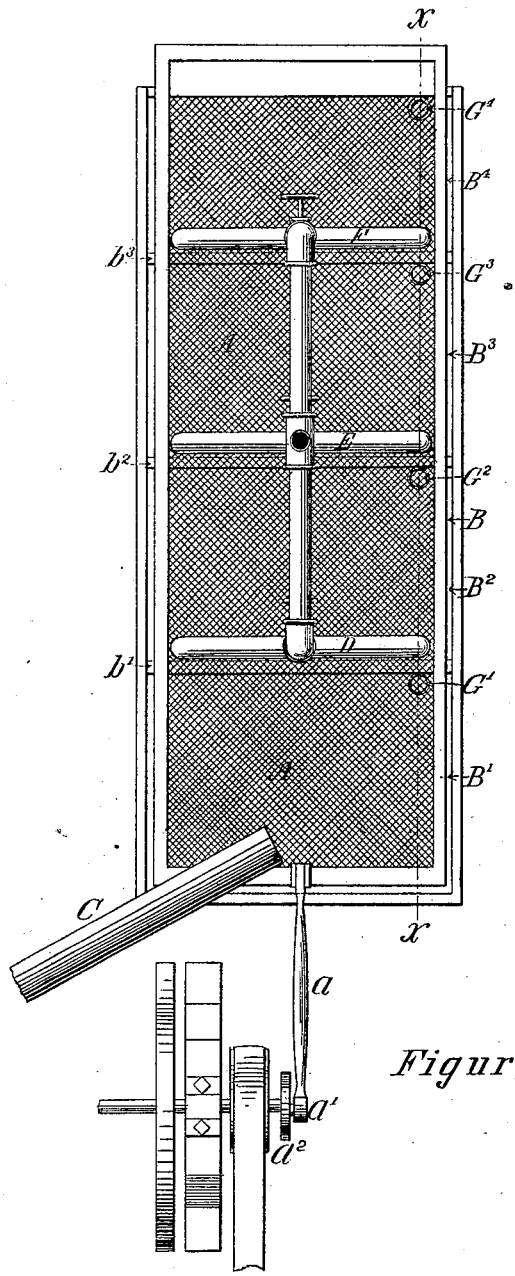

(No Model.)  2 Sheets—Sheet 1.

A. BEHR.
APPARATUS FOR MANUFACTURING STARCH LIQUOR.

No. 245,340. Patented Aug. 9, 1881.

Witnesses:
Wm Rumble
M. L. Adams.

Inventor:
Arno Behr,
Per Edw. E. Zumby,
Atty.

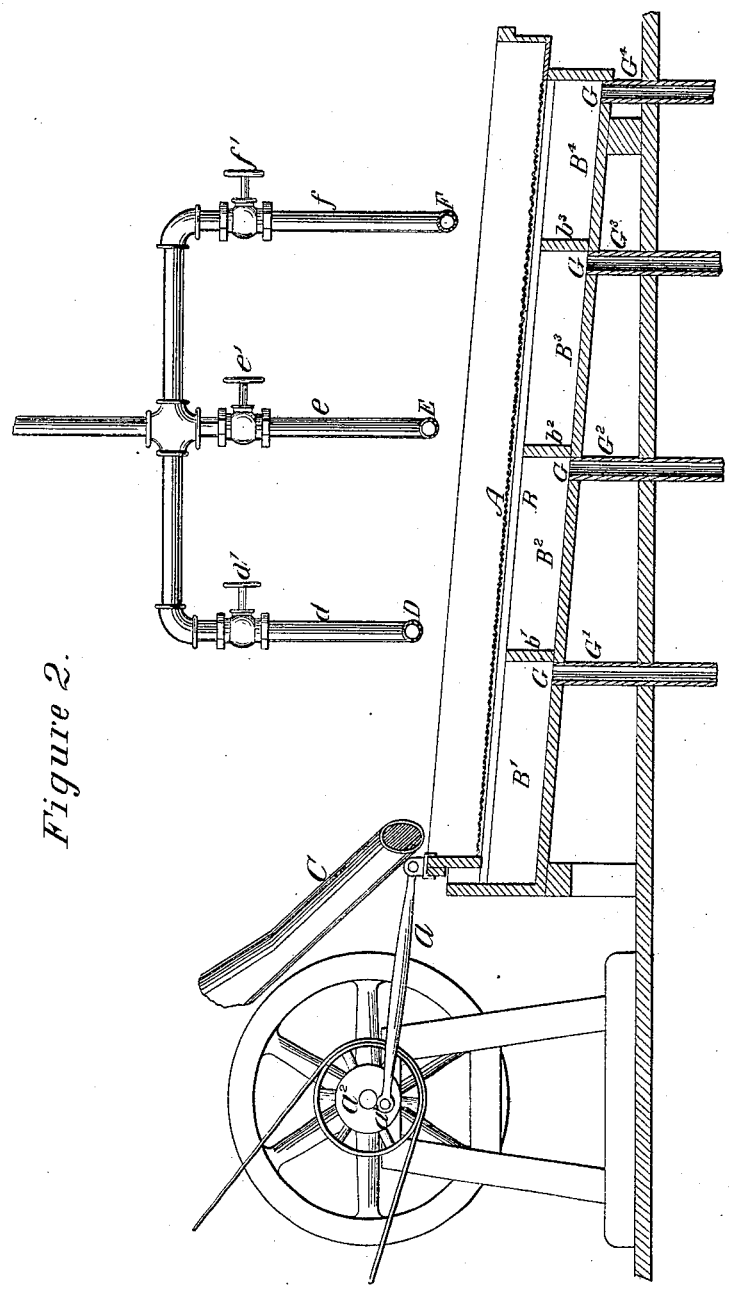

UNITED STATES PATENT OFFICE.

ARNO BEHR, OF JERSEY CITY, N. J., ASSIGNOR TO FRANZ O. MATTHIESSEN, OF IRVINGTON, AND WILLIAM A. WIECHERS, OF NEW YORK, N. Y.

APPARATUS FOR MANUFACTURING STARCH-LIQUOR.

SPECIFICATION forming part of Letters Patent No. 245,340, dated August 9, 1881.

Application filed June 17, 1881. (No model.)

*To all whom it may concern:*

Be it known that I, ARNO BEHR, of Jersey City, New Jersey, have invented certain Improvements in Apparatus for Manufacturing Starch-Liquor, of which the following is a specification.

In the manufacture of starch it has heretofore been common to grind the soaked corn in water, and to discharge the ground product through a comparatively long narrow inclined vibrating sieve, or, so called, "riddle," arranged immediately over an inclined trough, and to spray the surface of the material in the riddle with jets of water for the purpose of more effectually washing the starch from the refuse of the corn. The result of this spraying with water is of necessity a considerable dilution of all the starch-liquor or starch-milk caught in the trough underneath the sieve, such liquor having been heretofore discharged from the lower end of the trough only.

It is the object of my improvement to prevent unnecessary dilution of the starch-milk, and to that end I provide a series of discharge-openings in the bottom of the trough at intervals from the higher to the lower end, and connect these openings by means of suitable pipes with separate receiving-tanks, so that the starch-liquor filtered through the upper portions of the sieve may be conducted into separate tanks without being diluted by admixture with so much of the spraying water as the starch-liquor filtered through the lower portions of the sieve.

The apertures in the bottom of the trough may, if desired, extend completely across from one side to the other; but I prefer to insert a cylindrical pipe or pipes in the bottom of the trough at the desired points, and to erect transverse vertical partitions in the trough, thereby dividing it into separate compartments. In the first or highest of these compartments I may collect the starch-milk just as it comes from the grinding-machine, wholly undiluted with the spraying water, and in the next compartment I may collect the starch-milk slightly diluted with a portion of the spraying water, and in the next lower compartment another portion of the starch-milk more highly diluted, and so on to the lower end of the trough. The compartment at the lower end of the trough will contain the most highly-diluted starch-liquor, because it will have been mixed with water from all the spraying-pipes.

The sieve may be made of such length and the trough divided into such a number of compartments that the starch-liquor collected in the lowest compartment of the trough will contain but a very small percentage of starch; and it is a part of my design to conduct that liquor to the grinding-machine and use it for grinding corn, or to use it for any other purpose for which water is employed in the manufacture of starch.

The accompanying drawings, representing apparatus for filtering and separating starch-liquor embodying my improvements, are as follows:

Figure 1 is a top view. Fig. 2 is a longitudinal vertical section through the line $x\ x$ on Fig. 1.

The apparatus consists of the usual long and narrow sieve or riddle, A, set in an inclined position immediately over the trough B, and connected by means of the pitman $a$ with the crank-pin $a'$ inserted in the rotating disk $a^2$. By the rotation of the disk the usual longitudinal vibratory motion is imparted to the sieve.

A chute, C, is arranged in suitable position to discharge upon the upper end of the sieve the ground corn mixed with water as it comes from the grinding apparatus.

The usual horizontal spraying-pipes, D, E, and F, are arranged immediately over the sieve, and are supplied with water or other liquid from the pipes $d\ e\ f$, provided with the valves $d'\ e'\ f'$.

The trough is divided into several compartments, $B'\ B^2\ B^3\ B^4$, by means of the vertical partitions $b'\ b^2\ b^3$. The compartments are respectively provided at their lower ends, G, with the discharge-pipes $G'\ G^2\ G^3\ G^4$, by means of which the contents of the compartments, respectively, are conducted to separate tanks.

It will, of course, be understood that the number of compartments, or the number and location of the discharge-openings through the bottom of the trough at different elevations, may be varied at will without departing from my invention, which is present in any receiving-trough of the character described having two or more discharge-outlets from parts of its bottom, varying in elevation, for the purpose of separately collecting the starch-milk drained through the sieve into the upper portion of the receiving-trough, and thereby preventing its dilution with the spraying water, or with any considerable portion of spraying water discharged upon a lower portion of the sieve.

It will also be understood that the several compartments or sections of the trough may be regarded as independent troughs, each having such relation to that portion of the sieve immediately over it as to enable it to collect starch-liquor filtered through that portion of the sieve, and to prevent the admixture thereof with starch-liquor filtered through other portions of the sieve.

I claim as my invention—

1. In combination with an inclined vibrating riddle or sieve for filtering starch-liquor, an inclined receiving-trough arranged beneath the riddle and provided with two or more discharge-outlets through its bottom at variable elevations, substantially as and for the purpose described.

2. In combination with an inclined vibrating riddle or sieve for filtering starch-liquor, a receiving-trough arranged beneath the riddle and divided into sections or compartments by means of one or more transverse vertical partitions, each of such sections being provided with an outlet, whereby the starch-liquor filtered through that portion of the sieve immediately over either one of the compartments can be separately collected without admixture with starch-liquor filtered through other portions of the sieve.

3. The herein-described method of separately collecting from the filtering-sieve starch-liquors of variable density, which consists in the employment, in combination, with an inclined riddle or sieve, means for vibrating the same, means for discharging ground corn upon the same, and means of spraying water or other liquid upon the same, of separate troughs or sections of troughs respectively placed beneath different transverse sections of the sieve, and provided with independent discharge-outlets, substantially as set forth.

ARNO BEHR.

Witnesses:
M. L. ADAMS,
C. J. MILLS.